United States Patent [19]

DePoorter et al.

[11] 3,923,619

[45] Dec. 2, 1975

[54] O[18] ENRICHMENT PROCESS IN UO$_2$F$_2$ UTILIZING LASER LIGHT

[75] Inventors: Gerald L. DePoorter; Cheryl K. Rofer-DePoorter, both of Los Alamos, N. Mex.

[73] Assignee: The United States of America as represented by the United States Energy Research and Development Administration, Washington, D.C.

[22] Filed: Sept. 16, 1974

[21] Appl. No.: 506,479

[52] U.S. Cl..... 204/157.1 R; 204/DIG. 11; 423/253
[51] Int. Cl.[2]............................................ B01J 1/10
[58] Field of Search..423/253; 204/157.1 R, DIG. 11

[56] References Cited
UNITED STATES PATENTS

| | | | |
|---|---|---|---|
| 3,405,045 | 10/1968 | Hoskins | 204/DIG. 11 |
| 3,765,844 | 10/1973 | Rode | 423/253 X |
| 3,794,716 | 2/1974 | Ogle, Jr. | 423/253 |
| 3,808,550 | 4/1974 | Ashkin | 176/1 X |

OTHER PUBLICATIONS

Mayer et al., Applied Physics Letters, 17, (No. 12), pp. 516–519, (1970).

Porter et al., Nuclear Science Abstracts, 23, (No. 11), abs. No. 19710, (1969).

*Primary Examiner*—Benjamin R. Padgett
*Assistant Examiner*—E. A. Miller
*Attorney, Agent, or Firm*—Dean E. Carlson; Paul D. Gaetjens; Frank Jackson

[57] ABSTRACT

Photochemical reaction induced by laser light is employed to separate oxygen isotopes. A solution containing UO$_2$F$_2$, HF, H$_2$O and a large excess of CH$_3$OH is irradiated with laser light of appropriate wavelength to differentially excite the UO$_2^{2+}$ ions containing O[16] atoms and cause a reaction to proceed in accordance with the reaction 2 UO$_2$F$_2$ + CH$_3$OH + 4 HF → 2 UF$_4$↓ + HCOOH + 3 H$_2$O. Irradiation is discontinued when about 10% of the UO$_2$F$_2$ has reacted, the UF$_4$ is filtered from the reaction mixture and the residual CH$_3$OH and HF plus the product HCOOH and H$_2$O are distilled away from the UO$_2$F$_2$ which is thereby enriched in the O[18] isotope, or the solution containing the UO$_2$F$_2$ may be photochemically processed again to provide further enrichment in the O[18] isotope.

6 Claims, 2 Drawing Figures

$O^{18}$ ENRICHMENT PROCESS IN $UO_2F_2$ UTILIZING LASER LIGHT

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method of separating isotopes. In more detail, the invention relates to a method for separating isotopes by a photochemical process. In still more detail, the invention relates to a method of separating oxygen isotopes by a photochemical method.

The basis for all isotopic separation processes is very small differences in the chemical or physical properties of the isotopes of a particular element. They are characterized, in general, by single-stage separation factors close to unity, requiring large numbers of stages and much handling of process materials to achieve a required separation of significant amounts of isotopically enriched materials.

Following the discovery of $O^{18}$, numerous attempts were made to obtain oxygen-containing materials enriched in this isotope. This oxygen isotope is useful as a tracer in the study of reactions involving an oxygen bond. Many processes leading to isotopic fractionation have been tested for their suitability for oxygen enrichment. These include fractional distillation of water, liquid oxygen, carbon monoxide and organic liquids, thermal diffusion of oxygen and of carbon monoxide, electrolysis of water and chemical exchange reactions. While enriched $O^{18}$ can be obtained on a commercial scale using one or more of these processes, the procedures involved are expensive and the cost of the material is relatively great. Thus investigation of other methods of enriching oxygen in the $O^{18}$ isotope is desirable.

One other technique which has aroused considerable interest over a number of years is photochemical separation.

To obtain a separation of isotopes by photochemical means it is necessary that an isotopic shift exist in the absorption spectrum of the element or one of its compounds so that one isotopic species of the process material can be excited or activated to a greater degree than others. Second, a light source or an energy source must be obtained which is capable of emitting light at a very narrow wavelength, sufficiently narrow and at the proper frequency to excite the desired isotopic species. Third, a chemical reaction or a physical process must be found in which only the excited species takes part.

During the Manhattan Project, photochemical reactions were investigated as a possible means of isotope separation. Although identifiable enrichment was not obtained in these experiments, the possibility of isotope separation was not ruled out. The unpromising results obtained in the Manhattan Project can be explained by several factors. Even when great care and complicated apparatus were used to assure a monochromatic light source, other wavelengths than those desired were present. In addition, analysis for the isotopes was in a developmental state, and errors often crept in. Compounding this problem was the fact that enrichment by this process would be small after only a few stages. Even if enrichment has taken place under the far from perfect experimental conditions, it might not have been detected in the isotopic analysis.

A successful demonstration of photochemical isotopic separation more recently was the separation of mercury-202 and -204 from the remainder of the naturally occurring mercury isotopes. Mercury having the isotopic content found in nature is irradiated with light of a very narrow wavelength corresponding to the absorption for mercury-202 or -204, whereupon only atoms of that isotopic mass will be in the excited state. These excited molecules of one isotope can then undergo a chemical reaction which will not proceed with the unexcited molecules of other isotopic masses.

Renewed interest in this technique is due to the development of powerful monochromatic light sources in the form of lasers. Also, since analysis for the isotopes is now more reliable, it should be possible now to identify enrichment occurring to even a small degree and encouraging results might well lead the way toward techniques which would be suitable for separating isotopes in commercial quantities.

SUMMARY OF THE INVENTION

According to the present invention, photochemical reaction induced by laser light is employed to separate oxygen-16 and oxygen-18 present in $UO_2F_2$. This is accomplished by irradiating a solution containing $UO_2F_2$, HF, $H_2O$ and a large excess of $CH_3OH$ with laser light having a wavelength within a limited range within the general range of 22,250 $cm^{-1}$ to 27,600 $cm^{-1}$ to differentially excite the $UO_2^{2+}$ ions containing $O^{16}$ atoms. Specific usable ranges are 22,250 $cm^{-1}$ to 23,000 $cm^{-1}$, 24,250 $cm^{-1}$ to 24,750 $cm^{-1}$, 25,000 $cm^{-1}$ to 25,400 $cm^{-1}$, 25,600 $cm^{-1}$ to 26,100 $cm^{-1}$ and 26,500 $cm^{-1}$ to 27,000 $cm^{-1}$. The reaction $2\ UO_2F_2 + CH_3OH + 4\ HF \rightarrow 2\ UF_4 \downarrow + HCOOH + 3\ H_2O$ proceeds only in the presence of light, so if the above reaction is carried out short of completion — say to a 10% extent — and $UF_4$ is removed, the HCOOH, $H_2O$, $CH_3OH$, and HF can easily be separated from the residual $UO_2F_2$ which will be enriched in the oxygen-18 isotope. Since it has been shown that the exchange reaction between the oxygen present in $UO_2F_2$ and in $H_2O$ is quite slow, the isotopic ratio obtained as a result of the differential reaction will be retained during the processing.

DESCRIPTION OF THE INVENTION

Figure 1:
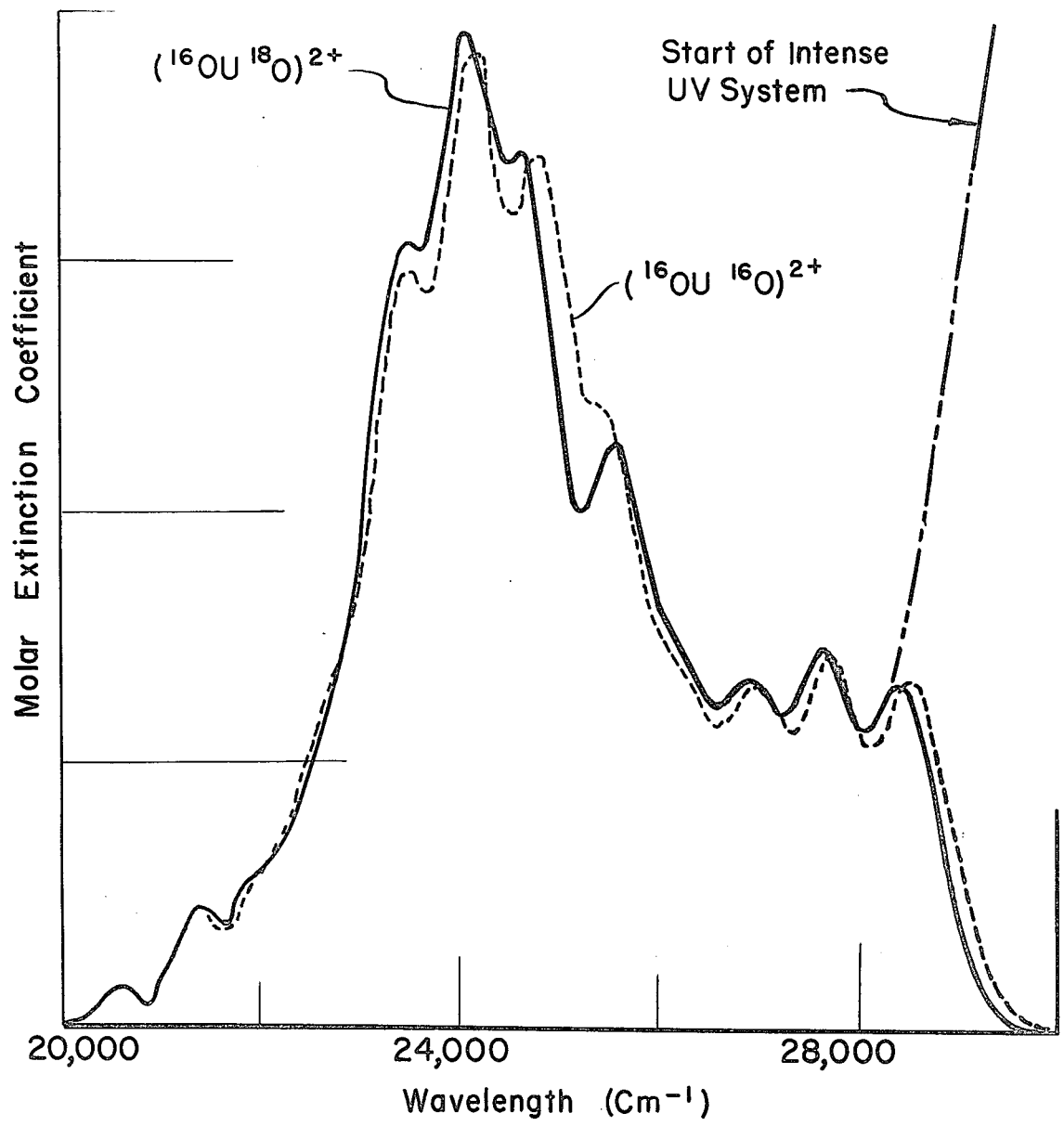
FIG. 1 is a graph in which the spectrum of [$^{16}O\ U\ ^{16}O$]$^{++}$ and a calculated spectrum for [$^{16}O\ U\ ^{18}O$]$^{++}$ are plotted and FIG. 2 is a graph in which the separation factor is plotted as a function of wavelength.

Vibronic spectra of molecules occur in the near-infrared, visible and ultraviolet regions. These absorptions result from combined electronic-vibrational transitions. The transition from the lowest vibrational level of the electronic ground state to the lowest vibrational level of the first excited electronic state is purely electronic. The transitions from the lowest vibrational level of the electronic ground state to higher vibrational levels of the first excited electronic state are vibronic. In room-temperature spectra of simple molecules, practically all vibronic transitions observed originate in the lowest vibrational level of the ground electronic state, because higher vibrational levels are only slightly populated.

Because of the vibrational component, an isotopic shift will appear in vibronic transitions. This shift will result in different absorption coefficients for different isotopes at the same wavelengths. For the uranyl ion ($UO_2^{2+}$), the vibrational structure results from combinations of the electronic transition and symmetrical stretching vibration.

The spectrum of $[^{16}O \; U \; ^{16}O]^{++}$ and a spectrum of $[^{16}O \; U \; ^{18}O]^{++}$ calculated using an analysis of the spectrum developed by J. T. Bell and R. E. Biggers, J. Mol. Spectry, 18, 247–75 (1965), and the interpretation of the spectrum outlined by S. DeJaegere and C. Görller-Walrand, Spectrochim, Acta., 25A, 559–68 (1969), are shown in the figure. The difference in absorption coefficients implies a difference in extent of photochemical reaction at a given wavelength. Thus, photochemical reaction induced by monochromatic light at an appropriate wavelength will give a product enriched in one isotope.

Accordingly a solution containing $UO_2F_2$, HF, $H_2O$ and $CH_3OH$ in a 1:2:26.7:400 molar ratio is irradiated with monochromatic light having a wavelength within a limited range within the general range of 22,150 cm$^{-1}$ to 27,600 cm$^{-1}$ employing a dye laser having an energy output of 10 millijoules/pulse and a pulse rate of 1 pulse per second. Such lasers are known to the art. Usable wavelength ranges are the following:

| Usable Wavelength Ranges (cm$^{-1}$) | | Centered on |
|---|---|---|
| 22,250 | to 23,000 | 22,500 |
| 24,250 | 24,750 | 24,500 |
| 25,000 | 25,400 | 25,200 |
| 25,600 | 26,100 | 25,900 |
| 26,500 | 27,600 | 27,000 |

The center wavelengths will give the best separations, but some separation will occur with light within the usable wavelength ranges. About 10% of the constituents of the solution will react as given in the formula

2 $UO_2F_2$ + $CH_3OH$ + 4 HF → 2 $UF_4$ + HCOOH + 3 $H_2O$ after irradiation with a dye laser having the energy output indicated within one of the usable wavelength ranges. It is essential that a large excess of methanol be included in the solution being irradiated since it is only with a methanol content approximately that given above that satisfactory results can be attained since this is required to make the absorption spectra sharp whereby the indicated separation factors are possible.

As shown in the graph the oxygen-16-containing $UO_2^{2+}$ is more reactive under the influence of certain wavelengths of light than is the oxygen-18-containing $UO_2^{2+}$. Thus the oxygen in the product HCOOH and $H_2O$ will be enriched in the $O^{16}$ isotope and the unreacted $UO_2F_2$ will be enriched in the $O^{18}$ isotope. It is known that the oxygen in $UO_2F_2$ and $H_2O$ exchanges very slowly. The half life of the reaction is on the order of weeks. Accordingly, the HCOOH and $H_2O$ can be separated from the unreacted $UO_2F_2$ by distillation or chemical means prior to exchange of the isotopes back to the ratio occurring in natural oxygen. The preferred procedure is thus to filter off the solid $UF_4$ and then distill the remaining constituents of the mixture away from the $UO_2F_2$. Since the separation attained in a single operation is small, a large number of stages will be necessary to attain a reasonable degree of separation.

It may be desirable not to separate liquid from $UO_2F_2$, or to partially distill it and process the solution further photochemically to achieve higher $O^{18}$ enrichments.

As stated above, the principle of this process is the difference in the absorption coefficients of two isotopic species of the same molecule at a given wavelength. From known and calculated spectral details the separation factor $\alpha$ is calculated as a function of wavelength.

The separation factor is defined by the equation

Figure 2:
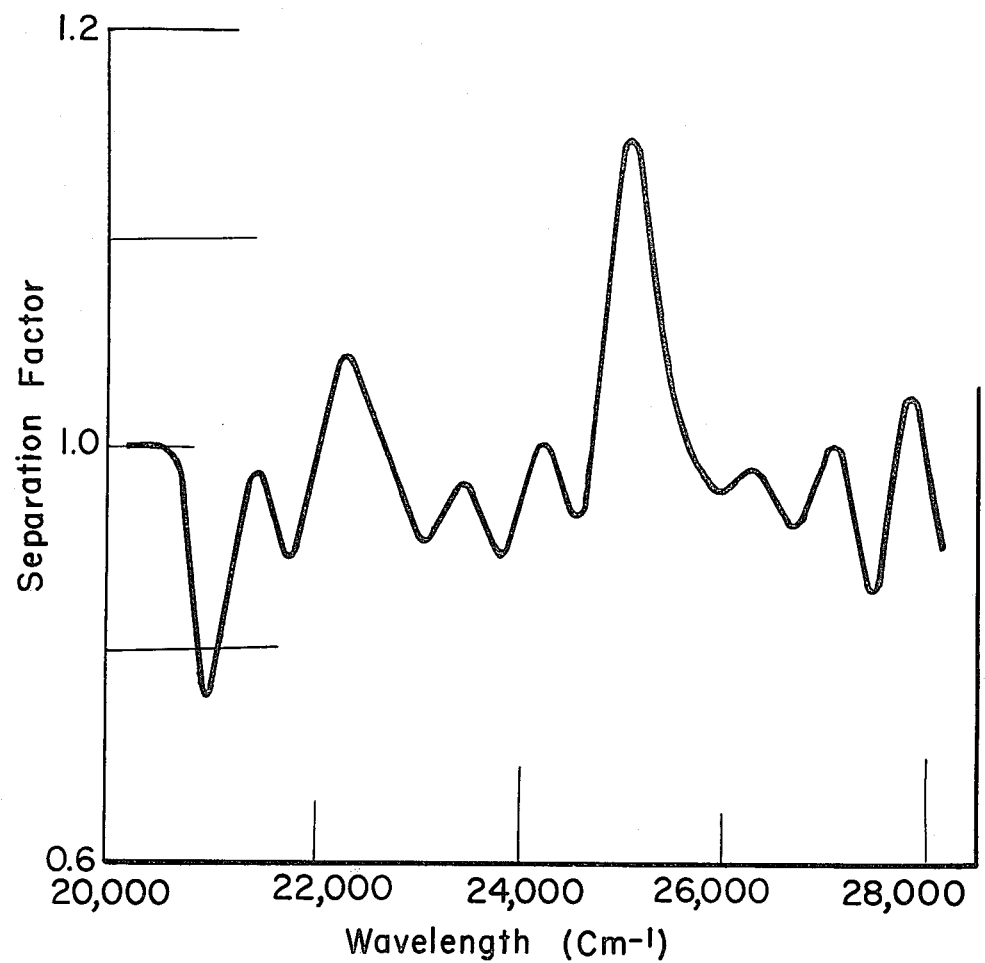

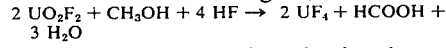

$$\alpha = \frac{n_A/n_B}{n_A'/n_B'}$$

where $n_A$, $n_B$ = mole fractions of isotopes A and B in one output stream of the process, and $n_A'$, $n_B'$ = mole fractions of isotopes A and B in the other output stream of the process. Using standard equations for photochemical reactions, it can be shown that $$\alpha \cong \frac{\epsilon_A}{\epsilon_B}$$

where $\epsilon_A$ and $\epsilon_B$ are the molar extinction coefficients of isotopic species A and B at a given wavelength. Using the calculated spectrum for each isotope and the equation above, $\alpha$ is calculated as a function of wavelength. The results are shown in FIG. 2. As is seen in FIG. 2, $\alpha$ is very wavelength dependent. This wavelength dependence is probably the reason the Manhattan Project experiments similar to those described here were not successful. This $\alpha$ is for separating the $^{16}O$ and $^{18}O$ in the uranyl ion.

The embodiments of the invention in which an exclusive property or privilege is claimed are defined as follows:

1. A method of separating oxygen-16 from oxygen-18 comprising irradiating a solution containing $UO_2F_2$, HF, $H_2O$ and a large excess of methanol with laser light having a wavelength within a limited range selected from within the general range of 22,250 cm$^{-1}$ to 27,600 cm$^{-1}$, whereby the reaction 2 $UO_2F_2$ + $CH_3OH$ + 4HF → 2$UF_4$ + HCOOH + 3$H_2O$ proceeds preferentially with $UO_2F_2$ containing the oxygen-16 isotope, until about 10% of the $UO_2F_2$ has reacted, filtering product $UF_4$ from the solution and recovering $UO_2F_2$ enriched in the oxygen-18 isotope from the solution.

2. A method according to claim 1 wherein the $UO_2F_2$ solution is further processed photochemically prior to recovery of $UO_2F_2$ from the solution.

3. A method according to claim 1 wherein the $UO_2F_2$ is recovered from the solution by distilling the remaining components of the solution therefrom.

4. A method according to claim 1 wherein the laser light is from a dye laser having an energy output of 10 millijoules/pulse and a pulse rate of 1 pulse/sec.

5. Method according to claim 4 wherein the wavelength of the laser light is 22,250 cm$^{-1}$ to 23,000 cm$^{-1}$, 24,250 cm$^{-1}$ to 24,750 cm$^{-1}$, 25,000 cm$^{-1}$ to 25,400 cm$^{-1}$, 25,600 cm$^{-1}$ to 26,100 cm$^{-1}$ or 26,500 cm$^{-1}$ to 27,600 cm$^{-1}$.

6. Method according to claim 5 wherein the molar ratio of $UO_2F_2$ to HF to $H_2O$ to $CH_3OH$ in the solution is 1:2:26.67:400.

* * * * *